April 26, 1960 C. T. STAFFA 2,934,118
ONION TRIMMING MACHINE
Filed July 15, 1957 3 Sheets-Sheet 1

INVENTOR.
Conrad T. Staffa,
BY Henry H. Snelling
ATTY.

April 26, 1960 C. T. STAFFA 2,934,118
ONION TRIMMING MACHINE
Filed July 15, 1957 3 Sheets-Sheet 2
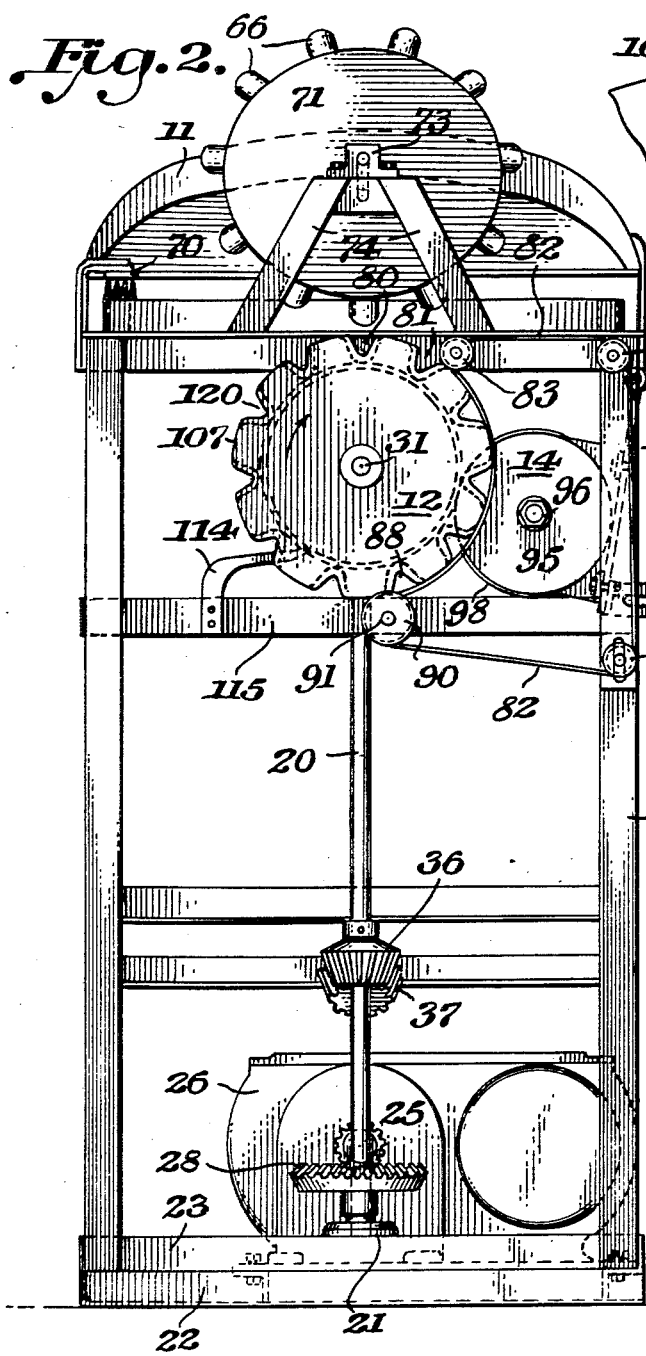
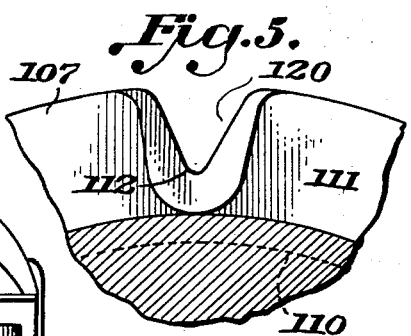
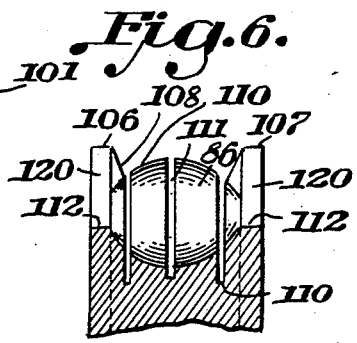
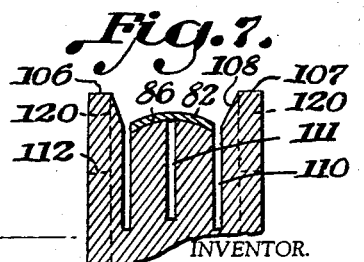
INVENTOR.
Conrad T. Staffa,
BY Henry H. Snelling
ATTY.

April 26, 1960     C. T. STAFFA     2,934,118
ONION TRIMMING MACHINE
Filed July 15, 1957     3 Sheets-Sheet 3

INVENTOR.
Conrad T. Staffa,
BY Henry H. Snelling
ATTY.

United States Patent Office 2,934,118
Patented Apr. 26, 1960

2,934,118

ONION TRIMMING MACHINE

Conrad T. Staffa, Glenarm, Md.

Application July 15, 1957, Serial No. 671,814

2 Claims. (Cl. 146—83)

This invention relates to the trimming of fruits, vegetables, etc. to remove unwanted portions thereof and has for its principal object the provision of a machine of simple, rugged, efficient design particularly suited to the cutting off of both polar ends of an object, for example the stem or stalk at the top of an onion and also the lower portion of the bulb including the roots and the bottom core which is of undesirable texture and sometimes detracts from the pleasant taste of the onion.

A further object of the invention includes the provision of a constantly revolving, automatically fed, main carrier in which the onions are securely held while both ends are simultaneously being trimmed. The term "onion" as used here and in the claims shall be understood to be generic rather than specific and therefore to include not only beets, turnips and other vegetables having a root portion and a stem portion but such fruits as pineapples, lemons, etc. where it is sometimes desired to cut off both end portions.

A still further object of the invention is to devise a novel manner of resiliently holding onions in the pockets of a main carrier and for positively ejecting an onion that might remain wedged in a pocket after the pocket has passed such resilient holding means and would otherwise be free to drop to a receiver, such as an endless belt or a receptacle.

Other objects of the invention are as set forth in the claims and include the relative positioning of the initial hopper, the intermediate circular carriage for pre-positioning the onions, and the cutting wheel or carrier in which the onions are held while being trimmed by cutters driven independently of the driving mechanism which rotates the three receptacles as well as the ejectors for transferring the onions from the hopper to the carriage and from the carriage to the cutting wheel or carrier.

In the drawings:

Figure 2 is an end elevation;

Figure 5 is a further enlarged side view of a portion of the carrier;

Figure 6 is an enlarged transverse section through a pocket; and

Figure 7 is an enlarged transverse section between pockets.

Figure 1:
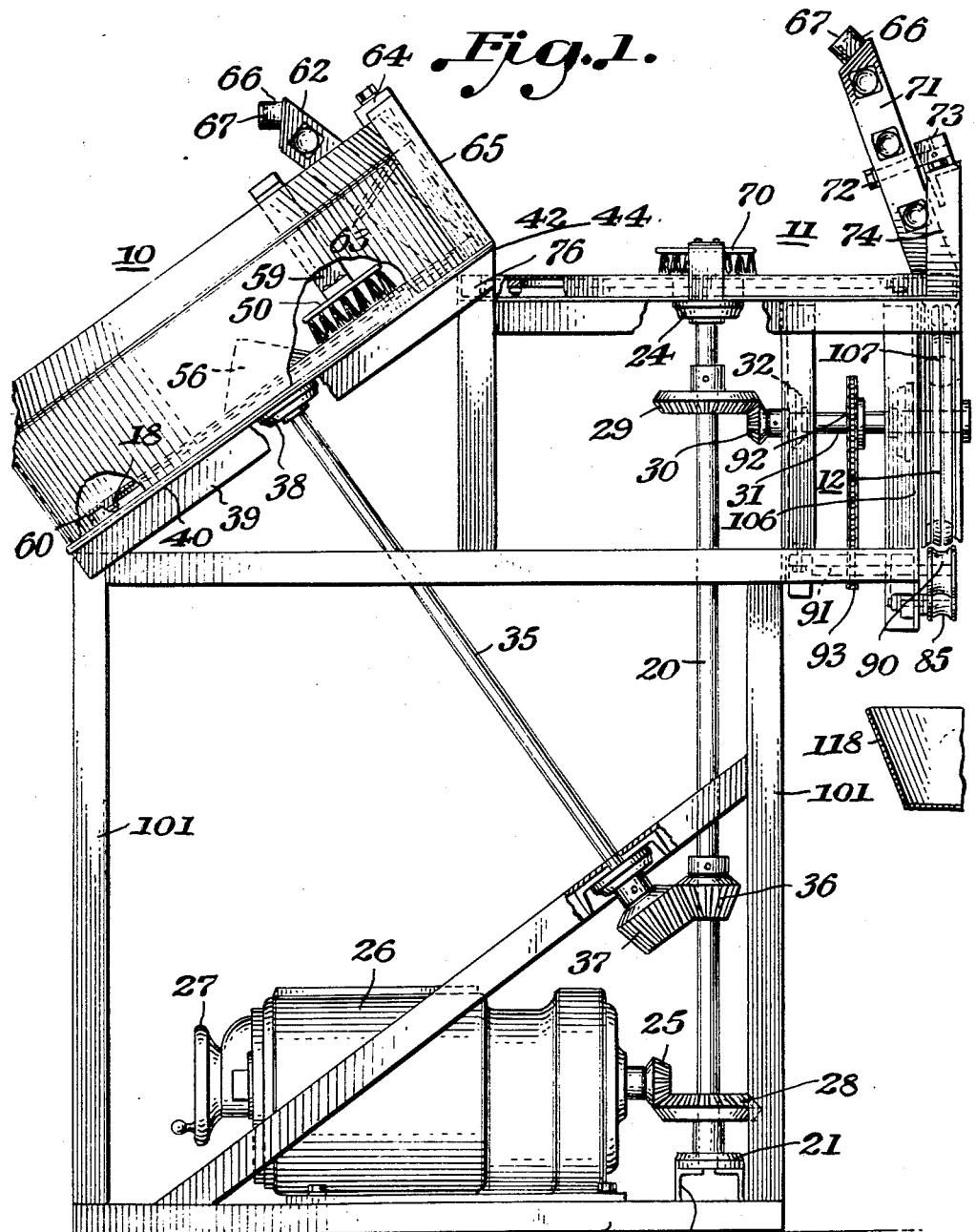
Figure 1 is a side elevation with some parts broken away.

The principal parts of the machine are a hopper or feed selector 10, an intermediate carriage 11, a carrier 12 and a cutting mechanism 14, the latter being driven entirely independently of the three named receptacles, the first two of which are driven at the same speed while the carrier having half the number of pockets is preferably driven at twice the revolutions per minute of the other two receptacles. The main shaft 20 is preferably upright as illustrated, being mounted in a lower bearing 21 resting on the frame base 22 as by a pair of angle irons 23 and by an upper bearing 24 in the superstructure supporting the intermediate carriage 11 and other mechanism.

The motive power for the main shaft 20 is supplied through a pinion 25 which could be driven directly from a motor but preferably is driven by a variable speed reduction gear unit 26 mounted on the base 22 and having the usual speed selector wheel 27 in the rear. Any other variable speed reduction gear would be equally suitable and I find that a reduction in speed of six to one gives probably the best results, the driving pinion 25 having a ratio of one to two with the bevel gear 28 keyed to the shaft 20. A similar bevel gear 29 drives the pinion 30 on auxiliary shaft 31 in suitable bearings 32 in the superstructure and shaft 31 is keyed to or otherwise secured to the carrier 12. The intermediate or pre-positioning carriage 11 is likewise keyed or otherwise secured to main shaft 20.

A sloping driven shaft 35 receives power from the main shaft 20 by means of two meshing gears 36 and 37 of the same size. The angle between shafts 20 and 35 is preferably 36°, this angle being fairly critical, as a variation of as little as four degrees has been found to give less satisfactory results. Above the upper bearing 38 supported indirectly by members 39, which form part of the frame, is a relatively heavy metal plate 40 against which the feed selector hopper 10 rotates, being fast to the shaft 35 and supported by a plurality, preferably six, of circumferentially spaced anti-friction bearings 18 of well known type in which a large central ball supports a ring of much smaller balls in a caster housing. Other forms of bearings for this hopper would be perfectly satisfactory but this particular type gives excellent service whether the hopper bottom be at a considerable angle, as is receptacle 10, or whether it be horizontal as is receptacle 11, the intermediate carriage.

Figure 3:
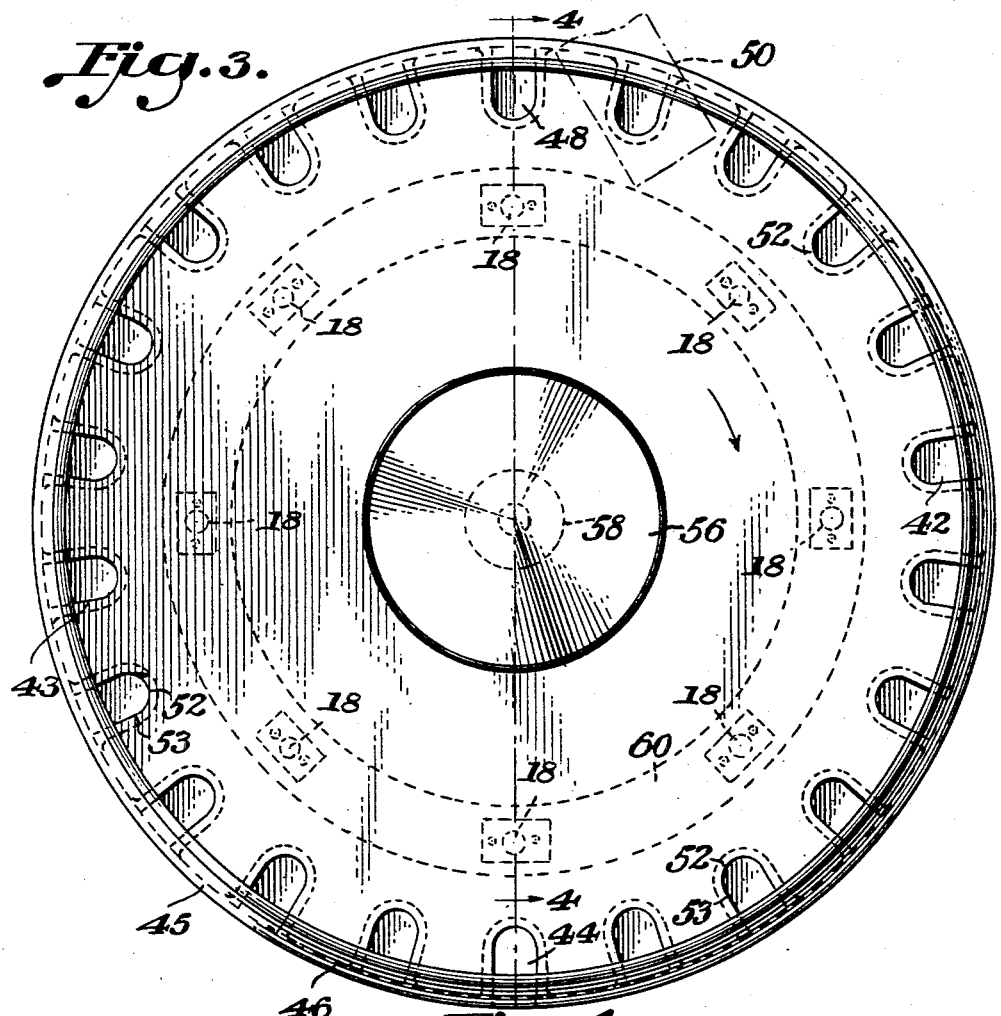
Figure 3 is an enlarged plan view of the hopper.
Figure 4:
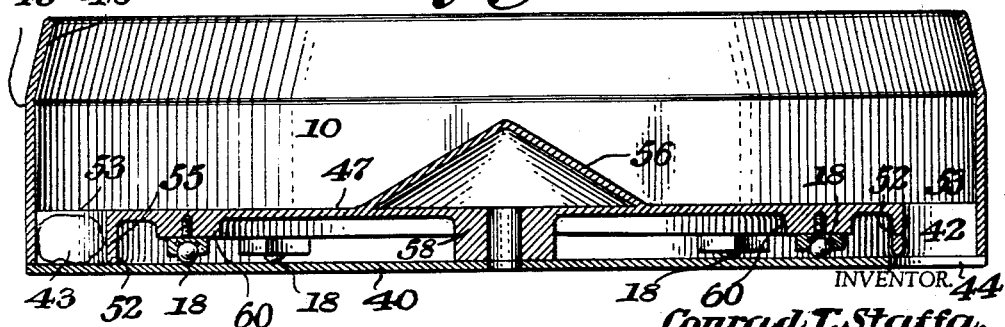
Figure 4 is an enlarged central section thereof.

Referring particularly to Figures 3 and 4, the metal plate 40 which supports the feed selector hopper 10 forms the bottom of all but one of the recesses in the hopper and consequently prevents any object in a recess falling until it reaches the cutaway portion 44 in the bed plate 40. Such cutaway portion is directly beneath the recess which has arrived at position 42 at the highest point and diametrically opposite recess position 43 which is at the lowest point. Onions dumped into the hopper are supported by fairly high flange 45, preferably tapered inward as at 46 near the top of the hopper so as to avoid the possibility of onions riding over the top of the flange 45 near recess 43.

The angle of tilt of the bottom 47 of the hopper is such that the onions gravitate toward the lowest recess 43 and by the time a recess reaches a position such as 48 the onions are roughly one to a pocket, but on passing this position the desired one to a pocket arrangement is insured by a restricting means 50 which brushes any extra onions back toward the lower end as the bottom of the hopper is slightly greater than the angle of repose and insures that each of the recesses from 48 up to 42 at the top contains only a single onion.

Each of the recesses is exactly the same size and this is preferably 1½" wide and 2½" long, the long axis being radial. Each recess has a rounded portion 52 toward the center of the receptacle, has flat parallel sides 53, and is bounded circumferentially by the continuous flange 45. On the inside the recess is bounded by a flange 55 extending downward from the bottom 47 around to the continuous flange 45, being integral with both. A non-essential provision, but a very convenient one, is a cone or cap 56 centrally positioned above the hub 58 of the hopper. This cap aids in urging unpocketed onions toward the low end and into a vacant recess.

The number of pockets is preferably twice an odd number, my preference being to have twenty-two pockets in each hopper. A restricting means of any type, here shown as an ordinary bristle brush 50, is shown at the far side supported by an iron strap 59 secured in any manner to the frame. The angle at which the brush extends is not critical but I prefer an angle of about 30° as shown in Fig. 3. The circular downward extending rib 60 in Fig. 4 is merely to furnish adequate support to the six anti-friction bearings 18 shown in Fig. 1 but not in Fig. 4, which is a central section through top recess 42 and lowest recess 43. The hopper rotates clockwise as seen in Fig. 3.

Referring again to Fig. 1, an ejector of suitable type pushes the onion out of pocket 42 when that pocket is directly over the space 44. A very simple ejecting device would be a mere spider with projections fitting consecutively into recesses but I prefer to mount a truncated cone 62 on a shaft 63 carried by an ell bracket 64 fast to the upper frame member 65. On the cone 62 there are a number of projections 66 evenly spaced around the periphery of the cone so that each in turn engages a recess in the hopper. I prefer these projections 66 to be angularly slanted so that they will be perpendicular to the bed 47 when the projection engages the flange 53 of the hopper recess. I also much prefer to dish out the top of the projection 66 as at 67 in elliptical form of a shape to engage fairly snugly the surface of the untrimmed onion. The ejector 62 is driven solely by its contact with the hopper.

The intermediate or pre-positioned carriage 11 is almost exactly the same shape and size as the hopper with two exceptions, one that the upper portion 45—46 of the main flange is omitted, as by the time the onions are transferred from the hopper 10 to the carriage 11 there is only one onion to a pocket and the carriage is horizontal. The other slight difference is that the restricting means, here numbered 70, is on the near side, as seen in Fig. 1, and the brush in this case is roughly parallel to the path of the onions as the carriage rotates in opposite direction to the hopper so that the onions travel in the near pockets only of the carriage. The brush 70 flips the onion into exactly the correct position so that the onion lies on its side with one polar end extending toward the center and the other end, whether stalk or root portion being immaterial, extending in the other direction. The ejector in this case is numbered 71 merely for convenience of reference as it is exactly the same as ejector 62 although its mounting on its own shaft 72 is preferably by means of a bracket 73 at the top of frame member 74.

I have sometimes found that it is better to make the recesses in the carriage a bit wider than those in the hopper; for example, I have had excellent success with pockets of the same radial size 2½" but 1¾" wide in the carriage and in one case even 2" wide. The increased width of the recesses in the carriage is to take care of any possible change of angle of the long axis of the onion in falling from pocket 42 to the pocket just beneath, this pocket for convenience being numbered 80. The projection 66 of ejector 71 pushes the onion only a short distance into the recess in the cutting wheel or carrier 12, the pocket in which is 1½" in diameter with a length of 2¼".

The carrier 12, as best seen in Fig. 2, is a cutting wheel shown with eleven pockets, each being of the shape shown in Fig. 6 which is a radial section through a pocket. The carrier turns clockwise as seen in Fig. 2 at about 32 rpm and receives an onion from carriage 11 at position 80. The onion stays in the pocket by gravity to the nearest position shown at 81 at which time the untrimmed onion is resiliently held in the bottom of its pocket by an endless belt 82 passing over idle wheels 83, 84, and 85, each contoured to fit the crowned central portion 86 of the carrier. The belt 82 engages the carrier 12 almost to its lower point, position 88 for example, and below this position there is a contoured driving wheel 90 on shaft 91 driven from jack shaft 31 by sprocket wheels 92 and 93 so that the belt travels at about 126 feet per minute. The driving wheel 90 is of considerable importance as, if this wheel were an idler and reliance were placed solely on the frictional contact of the belt and the carrier, there would be danger of jamming, whereas with the drive shown a very smooth operation is had, the peripheral speed of the carrier being identical with the speed of the belt.

The cutting mechanism consists of two disks 95 spaced in accordance with the size of the onion to be cut, about 1⁵⁄₁₆" for a 1½" diameter onion, and mounted on a shaft 96 which is the armature of motor 98 bolted to a support 99 pivoted as at 100 to the upright main frame member 101. The knives 95 are of the same size and may be either sharpened disks or the disks may be serrated to form saw teeth. The motor 98 is entirely independent of the mechanism for driving the other portions of the machine and the penetration of the cutting disks 95 into the carrier 12 is adjusted by means of a manual locking wheel 103 which binds a link 104 fast to the motor support 99 to a bracket 105 fast to the upright 101.

Referring to Figures 5, 6, and 7, the carrier 12 is a wheel having two outer rims or margins 106 and 107. Sloping walls 108 lead down from the rims to the crowned portion 86 which is engaged by the belt 82. At the two junctions there are parallel deep kerfs 110 to receive the knives 95 which are spaced to fit in these two kerfs which extend deeper than the points of intersection with the pocket surface. Between the kerfs 110 there is a central kerf 111 which preferably is exactly the same radial depth as the bottom of the pocket although it may, if desired, be slightly deeper. The function of the central kerf 111 is solely to receive a knocker or other object releasing means 114. This device may be a simple spring pressed finger mounted on horizontal bar 115 of the frame with its point resting very gently in the bottom of the groove 111 so that should an onion on reaching position 86 be jammed in its pocket for any reason and not fall as this pocket passes to the left of the belt, it will be ejected from the pocket by the knocker 114 so that it will nevertheless fall into the waiting receptacle, diagrammatically shown as a pail 118 but which in practice would generally be a conveyor belt for carrying the trimmed onions to another location for subsequent handling. Because of the crowning of the central portion 86 of the carrier I find no tendency of any kind for the belt 82 to slip sideways so that it might touch a saw or knife 95 as it passes into a kerf 110. The belt rides centrally over kerf 111 but this kerf is not used until the pockets are entirely free of the belt.

As best seen in Fig. 6 the pockets are ellipsoidal, having a short diameter of 1½" and a long diameter of 2¼". The flanges 106 and 107 are each cut away as at 120, the angle being 60° and rounded at the bottom 112 with a radius of about ¼" to accommodate the polar end of the onion which might be the root end or might be the stalk end, an advantage of the machine being that the onions need not be definitely oriented; i.e. there is no occasion for all of the stalks to project in the same direction. A convenient diameter for the carrier is 15" and the overall width of the carrier is 2½". The kerfs 110 can be as small as ¹⁄₂₀" in width but I prefer to have the central kerf quite appreciably wider, .08" being ample, however.

The operation of the device is as follows: Partially prepared onions are dumped into the hopper 10 and move by gravity toward the lower end, filling the recesses in that neighborhood, i.e. at the lower end. The hopper rotates to carry the pocketed onions away from the observer and the recesses pass under brush 50 which insures that no recess shall be occupied by two onions. On reaching the hopper position 42 a projection 66 extending from ejector 62 pushes the onion from its pocket through an opening 44 in the supporting base plate 40 which does not revolve. The onion is therefore passed from recess 42 in the hopper to recess 76 in the carriage 11 a bit below. Here the onion passes toward the observer, in Fig. 1, so that it is brought under the brush 70. This brush flips the onion into accurate position so that its long dimension corresponds to the long dimention of the recess. On reaching the right hand side of the machine the ejector 71 pushes the onion directly below into a pocket 80 (Fig. 2). The pocketed onion is supported by gravity through a small angle and it then is met by the belt 82 constantly revolving at the same linear speed as the carrier 12. After the pocketed onion has passed the slight bit over 90° in the carrier, it is trimmed by two rapidly revolving parallel blades 95 which cut off both ends of the onion. The onion travels an additional 90° which brings it out of contact with the belt 82 and the trimmed onion therefore drops to the waiting receptacle 118 which usually is an endless conveyor belt. If by any chance the onion should be jammed in a pocket and will not fall by gravity, it is pushed out of the pocket by an ejector 114 which rides in a groove or kerf in the center of the carrier 12.

What I claim is:

1. In an onion trimming mechanism the combination of a rotatable circular carrier having in its periphery a pair of circumferential kerfs and a plurality of spaced ellipsoidal pockets, each with its longer axis parallel to the carrier axis, opening to the carrier periphery, said kerfs each intersecting the pockets and extending radially deeper than the points of intersection with the pocket surface means for rotating the carrier, rotating cutting disks extending into the kerfs to sever the polar ends of objects held in the pockets, a belt passing between the disks to engage a portion of the carrier periphery to hold the objects in the pockets, said belt having a width approximating the distance between the disks, and the portion of the carrier engaged by the belt is crowned to eliminate lateral shifting of the belt toward either disk.

2. The combination of claim 1 in which the belt engages the carrier periphery through an angle of between 30° and 170° and is pulley-driven at the same peripheral speed as the carrier, and has a third kerf between the two kerfs to receive the cutting mechanism, said third kerf being centrally located and of a radial depth approximately that of the bottoms of the pockets, the axis of the carrier is horizontal, the belt driving pulley is nearly directly below the carrier axis so an object in a pocket passing the driving pulley may fall by gravity, and object-releasing means engaging the third kerf to force out an object stuck in a pocket which has passed the driving pulley.

References Cited in the file of this patent

UNITED STATES PATENTS

| | | |
|---|---|---|
| 437,853 | Craver | Oct. 7, 1890 |
| 1,220,684 | Ray | Mar. 27, 1917 |
| 1,935,408 | Marino et al. | Nov. 14, 1933 |
| 2,187,233 | Garner et al. | Jan. 16, 1940 |
| 2,494,914 | Urschel et al. | Jan. 17, 1950 |
| 2,571,531 | Bridge | Oct. 16, 1951 |
| 2,638,949 | Bevins et al. | May 19, 1953 |

FOREIGN PATENTS

| | | |
|---|---|---|
| 170,524 | Great Britain | Oct. 27, 1921 |